United States Patent
Gates et al.

(10) Patent No.: US 6,637,707 B1
(45) Date of Patent: Oct. 28, 2003

(54) REMOVABLE HOLDER

(75) Inventors: George D. Gates, South Jordan, UT (US); Travis D. Gates, Riverton, UT (US)

(73) Assignee: All Rite Products, Inc., West Jordan, UT (US)

( * ) Notice: Subject to any disclaimer, the term of this patent is extended or adjusted under 35 U.S.C. 154(b) by 0 days.

(21) Appl. No.: 09/459,098

(22) Filed: Dec. 13, 1999

(51) Int. Cl.[7] .................................................. A47F 7/00
(52) U.S. Cl. .............................. 248/224.7; 248/222.12; 211/64
(58) Field of Search .................... 248/224.7, 206.3, 248/206.2, 205.5, 309.3, 311.2, 225.21, 222.11, 683, 221.11, 225.11, 222.13, 223.41, 224.51, 224.61; 24/482; 403/381, 319; 211/64, 89, 70.6, 60.1, 70.5

(56) References Cited

U.S. PATENT DOCUMENTS

| | | | | |
|---|---|---|---|---|
| 2,708,088 A | * | 5/1955 | Steinke .................... 248/223.1 |
| 3,878,589 A | | 4/1975 | Schaefer .................... 24/222 R |
| 3,915,189 A | | 10/1975 | Holbrook .................... 137/205 |
| 3,931,893 A | | 1/1976 | Elkins et al. ................. 211/64 |
| 4,450,989 A | | 5/1984 | Bogar, Jr. ............ 224/42.45 R |
| 4,461,445 A | | 7/1984 | Williamson ................. 248/551 |
| 4,858,869 A | | 8/1989 | Stang ...................... 248/311.1 |
| 5,026,016 A | | 6/1991 | Lisowski ................... 248/314 |
| 5,035,389 A | | 7/1991 | Wang ...................... 248/224.1 |
| 5,078,279 A | * | 1/1992 | Hancock et al. ............... 211/64 |
| D329,192 S | | 9/1992 | Susac ...................... D8/349 |
| 5,344,032 A | * | 9/1994 | Ramsdell ..................... 211/64 |
| 5,356,038 A | | 10/1994 | Banks ......................... 222/96 |
| 5,433,416 A | | 7/1995 | Johnson ................... 248/475.1 |
| 5,435,511 A | | 7/1995 | Hsu ......................... 248/206.3 |
| 5,452,874 A | * | 9/1995 | Kozloff et al. ............ 248/222.1 |
| D386,298 S | * | 11/1997 | Hancock ..................... D3/218 |
| D386,304 S | * | 11/1997 | Hancock ..................... D3/262 |
| 5,765,699 A | * | 6/1998 | Griffin ....................... 211/70.6 |
| 5,915,572 A | * | 6/1999 | Hancock ...................... 211/64 |

* cited by examiner

*Primary Examiner*—Kimberly Wood
(74) *Attorney, Agent, or Firm*—Thorpe North & Western

(57) ABSTRACT

A removable holder comprises a mounting base (10) and item holding device (12). The mounting base (10) is intended to be semi-permanently attached to a vertical wall, and the item holding device (12) is designed to be manually mounted within a tapered dovetail receptacle (26) formed in the mounting base for manual removal from the mounting base when not in use. The item holding device (12) incorporates a male tapered dovetail section (32) for mating into the female dovetail section (26) of the mounting base (10). A locking tab (46) is formed with the mounting base (10) in a manner to be biased outwardly to snap into a locking position against a top surface (40) of the male dovetail section (32) to lock the male dovetail section in place. Pressing on the locking tab (46) pushes it out of the way so that the male dovetail section (32) of the item holding device (12) can be manually removed from the female dovetail angled surfaces (26) of the mounting base (10). The item holding device (12) comprises a "U"-shaped cradle (30) having a series of "V"-shaped cradle interior members (56) made of a relatively soft and deformable rubber material so as to readily deform against the weight of an item placed in the cradle member (30), thereby intending to grasp onto the item to help retain the item within the cradle member. The cradle member (30) also includes a resilient rubber locking strap (54) for stretching over and locking against the outside cradle member in order to retain the item placed therein.

19 Claims, 3 Drawing Sheets

REMOVABLE HOLDER

BACKGROUND OF THE INVENTION

1. Field of the Invention

The present invention generally relates to a holder for supporting items of various shapes and configurations on a generally vertical wall, and more particularly relates to such a holder that is (1) readily removable from its mounting base on the wall; and (2) interchangeable with holding devices of various shapes and configurations for holding a variety of items.

2. Description of the Related Prior Art

Various holding devices are in common use that incorporate: (1) a mounting base that is attached to a generally vertical surface; and (2) a removable holder that is designed to removably attach to or mount in the mounting base for holding one or more particular objects. Typical of these are illustrated in U.S. Pat. Nos. 5,026,016, 5,433,416, 3,915,189, 4,858,869, 5,035,389, and 5,435,511 that illustrate wall-mounted attachment receptacles for hanging a microphone, soap or lotion dispenser, aspiration container, cup, personal products container, and aquatic appliance, respectively. Various of these prior art devices also include locking mechanisms for locking the particular item in its wall-mounted mounting bracket. For instance, the microphone mount uses a spring or biased projection that mates with a cooperating detent. This type of "locking" mechanism is not necessarily a locking mechanism, in that the force applied to detach the microphone from its mount is equal to the force required to attach the microphone to its mount.

U.S. Pat. No. 5,035,389 incorporates an opposed latch mechanism that snaps outwardly to lock the container in place on a wall. Due to the very narrow space between the wall and the container, it is virtually impossible to actuate (compress) the opposed latch mechanism fingers to release the container from its wall mount. U.S. Pat. No. 5,435,511 shows a similar detachment mechanism that, while more accessible for manual detachment, is much more complicated in construction, and also includes two opposing latch mechanisms that must be released simultaneously in order for the removable container to be removed from its wall mounting.

SUMMARY OF THE INVENTION

A removable holder comprises a mounting base 10 and item holding device 12. The mounting base 10 is intended to be semi-permanently attached to a vertical wall, and the item holding device 12 is designed to be manually mounted within a tapered dovetail receptacle 24 formed in the mounting base for manual removal from the mounting base when not in use. The item holding device 12 incorporates a male tapered dovetail section 32 for mating into the female dovetail receptacle 24 of the mounting base 10. A locking tab 46 is formed with the mounting base 10 in a manner to be biased outwardly to snap into a locking position against a top surface 40 of the male dovetail section 32 to lock the male dovetail section in place. Pressing on the locking tab 46 pushes it out of the way so that the male dovetail section 32 of the item holding device 12 can be manually removed from the female dovetail angled surfaces 26 of the mounting base 10.

The item holding device comprises a "U"-shaped cradle 30 having a series of "V"-shaped cradle interior members 56 made of a relatively soft and deformable rubber material so as to readily deform against the weight of an item placed in the cradle member 30, thereby tending to grasp onto the item to help retain the item within the cradle member. The cradle member 30 also includes a resilient rubber locking strap 54 for stretching over and locking against the outside cradle member in order to retain the item placed therein.

DETAILED DESCRIPTION OF THE PREFERRED EMBODIMENTS

Figure 1:
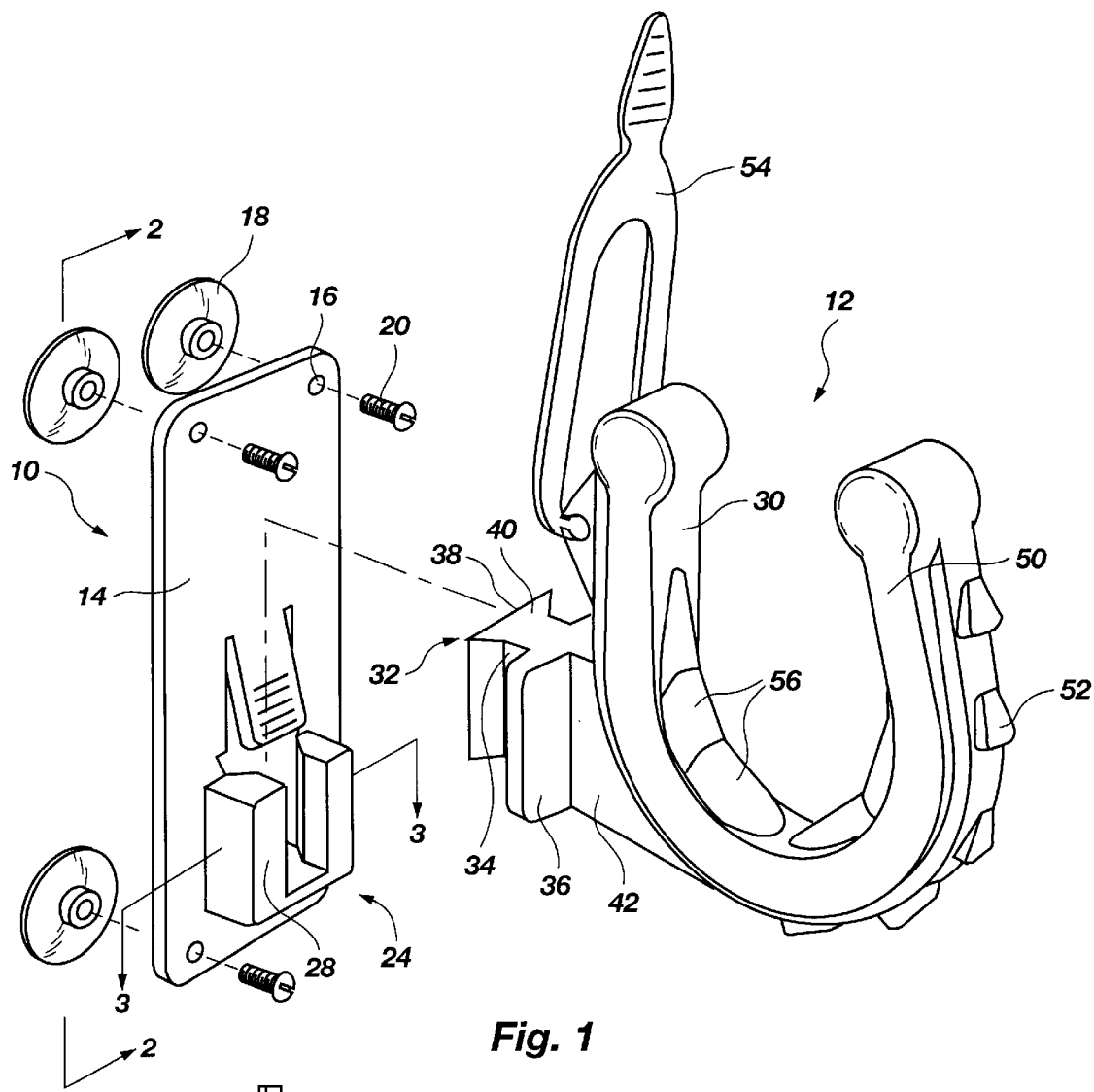
FIG. 1 is a perspective view of the removable holder of the present invention, the holding device separated from the mounting base for clarity.
Figure 2:
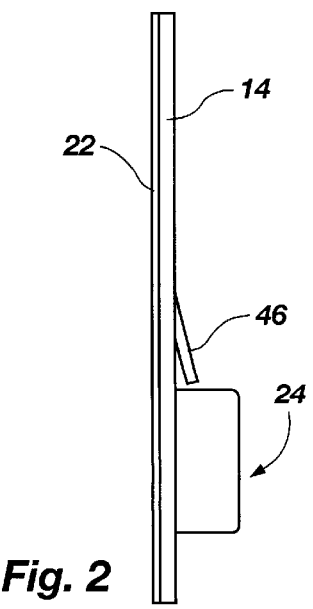
FIG. 2 is a left side plan view of the removable holder mounting base taken in the direction of arrows 2—2 in FIG. 1.

Referring initially to FIG. 1, a first embodiment of the removable holder of the present invention is shown in perspective view. The removable holder of FIG. 1 comprises a mounting base 10 and an item-holding device 12, which in this first embodiment is in the form of a cradle. The mounting base 10 comprises an essentially planar back plate 14, having a pressure-sensitive peal-and-stick adhesive 22 on the back side thereof for attaching the mounting base to a vertical, flat, smooth surface, as in a glass pane. The mounting base planar back plate 14 also includes a plurality of mounting holes 16 (generally four) for enabling the mounting base to be screw-mounted directly to the vertical surface, i.e., a wall. In addition, the mounting base 10 can be mounted to a glass pane, mirror, etc., by the use of suction cups 18, commonly attached to the back side of the mounting base planar back plate 14 by screws 20 inserted through the mounting holes 16.

Figure 3:
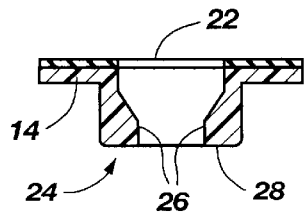
FIG. 3 is a horizontal sectional view of the removable holder mounting base taken through lines 3—3 in FIG. 1.

A mounting receptacle 24 is formed with the bottom portion of the mounting base 10, and is in the general configuration of a "U". As best shown in FIG. 3, the mounting receptacle is formed with an interior dovetail receptacle mechanism defined by angled surfaces 26 formed on the interior side of the mounting receptacle 24. These dovetail angled surfaces 26 cooperate with a flat vertical front surface 28 of the mounting receptacle 24 to retain the item-holding device (cradle) 30 in functional position, as will be described in greater detail hereinbelow.

Figure 4:
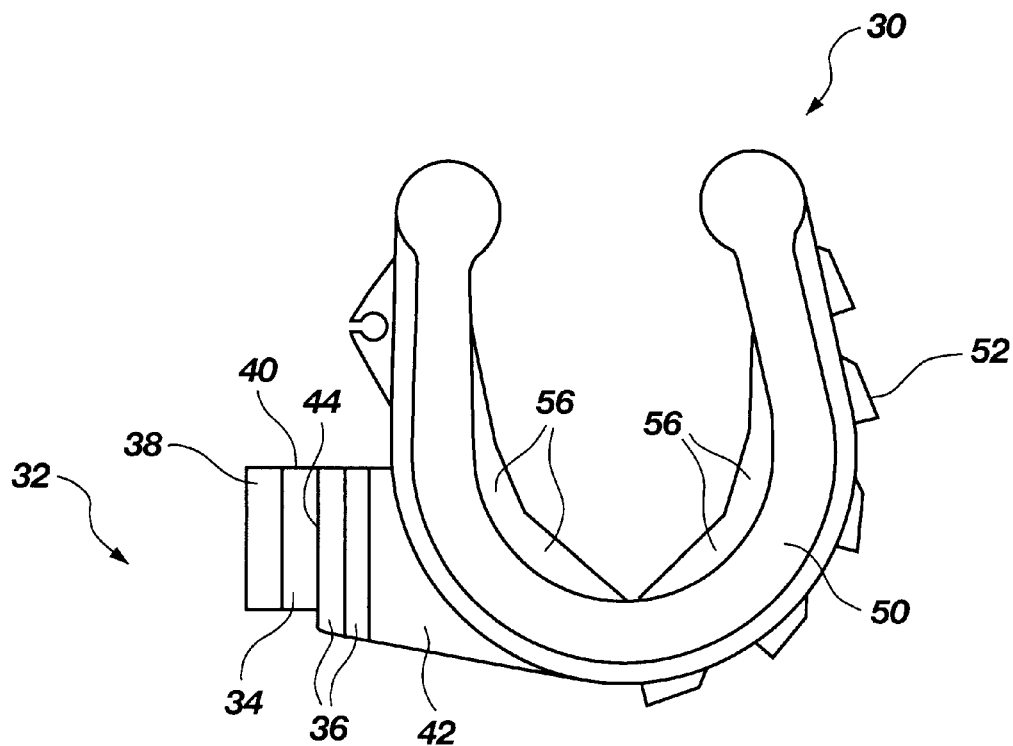
FIG. 4 is a left side plan view of the item-holding device of FIG. 1.

FIG. 1 also illustrates a first embodiment of the item-holding device 12 in the form of a "U"-shaped cradle 30. The "U"-shaped cradle 30 is attached to a male dovetail mechanism 32 designed to mate with the female dovetail angled surfaces 26 of the mounting receptacle. To this end, the cradle male dovetail mechanism 32 includes a rib 34 (best shown in FIG. 5) that extends normally from a dovetail retaining lip 36 (again, best shown in FIG. 5). The dovetail rib 34 terminates in a flared out portion 38 defining the dovetail. The cradle male dovetail mechanism 32 also includes a bottom surface (not shown) and a top surface 40, the function of which will be described in greater detail hereinbelow. The cradle male dovetail mechanism 32 is attached to the "U"-shaped cradle 30 by a boss 42 in a manner to orient the "U"-shaped cradle 30 open at the top when the dovetail mechanism 32 is oriented vertically as shown in FIGS. 1 and 4.

Referring again to FIG. 1, it should now be obvious how the removable holder item-holding device 12 (cradle 30) fits into the mounting base mounting receptacle 24. Specifically, the cradle male dovetail mechanism 32 simply slides down into the female dovetail mechanism defined by the dovetail angled surfaces 26 in the mounting base mounting receptacle 28. Those skilled in the art can appreciate that the rear surfaces 44 of the dovetail retaining lip 36 engage the front surface 28 of the mounting receptacle in order to align the cradle male dovetail mechanism 32 with the female dovetail angled surfaces 26. It should also be pointed out that, as shown in FIG. 4, the dovetail retaining lip 36, and therefore, the dovetail retaining lip rear surfaces 44, extend a finite distance below the dovetail 38 and dovetail rib 34 in order that the cradle male dovetail mechanism 32 may be properly aligned prior to insertion down into the female dovetail mechanism.

Both the cradle male dovetail mechanism 32 and the mounting base dovetail mechanism (the dovetail angled surfaces 26) are tapered inwardly slightly from top to bottom to enable the male dovetail mechanism to be more easily inserted into the mounting base dovetail mechanism. The angles of taper of both dovetail mechanisms are approximately identical so that, when the cradle dovetail mechanism 32 slides down to the bottom surface of the mounting base female cradle mechanism, the mating dovetail surfaces (the flared out section 38 of the cradle male dovetail mechanism and the dovetail angled surfaces 26 of the mounting base) tightly engage each other in a solid planar engagement that functions to rigidly position and hold the cradle 30 in its intended vertical orientation.

Returning again to FIG. 1, the mounting base planar back plate 14 includes a locking tab 46 that is formed therewith and is biased slightly outwardly from the plane of the back plate. Those skilled in the art will appreciate that this back plate locking tab 46 is designed to be pushed inwardly by the cradle male dovetail mechanism 32 as the dovetail mechanism is positioned and slid down into the female dovetail mechanism defined by the mounting-receptacle dovetail angled surfaces 26. It can also be appreciated that the length (vertical height) of the cradle male dovetail mechanism 32 is essentially equal to the depth of the mounting receptacle female dovetail mechanism, so that the end surface (not numbered) of the mounting base back plate locking tab 46 will snap forward under its own bias when the cradle male dovetail mechanism 32 is firmly seated in the female dovetail mechanism, so that the locking tab 46 will be biased outwardly in order to engage the cradle male dovetail mechanism top surface 40 in order to retain the cradle male dovetail mechanism 32, and therefore the item-holding device 12 (cradle 30) in functional position within the mounting base mounting receptacle 24. Those skilled in the art will also readily appreciate that the back plate locking tab 46 is easily manually pushed inwardly in order to be released from the dovetail mechanism top surface 40, whereby the cradle male dovetail mechanism may then readily be withdrawn upwardly from the mounting base mounting receptacle 24. In this regard, the function of the locking mechanism (the locking tab 46) should be readily obvious. The purpose of removability of the item-holding device 12 (cradle 30) from the mounting base 14, however, will be described in greater detail hereinbelow.

Referring again to FIGS. 1, 4, and 5, the "U"-shaped cradle 30 is shown to comprise a molded hard plastic "U"-shaped piece 48 that is molded with the boss 42 that connects the "U"-shaped cradle to the cradle male dovetail mechanism. The item-holding device of the present invention, however, further includes an improvement over presently existing cradle-type mounts. Specifically, the "U"-shaped cradle 30 of the present invention includes a thick molded rubber encasement 50 totally surrounding the "U"-shaped hard plastic piece 48. This molded rubber encasement 50 is multi-functional. Initially, it serves as a protective covering and cushioning covering for the hard plastic "U"-shaped piece 48. Secondly, the molded rubber encasement 50 includes a plurality of molded rubber fingers 52 that provide a locking mechanism for a locking strap 54 (shown in FIG. 1). The locking strap 54 is also formed of an elastomeric material (i.e., rubber) so that it can be manually pulled over the outer vertical section of the "U"-shaped cradle and locked below the appropriate molded rubber fingers 52 in order to secure an item within the cradle 30, in a customary manner.

Thirdly, the molded rubber encasement 50 includes a plurality of graduated "V"-shaped cradle interior members 56 that serve a specific function not provided by prior "U"-shaped cradle holding brackets. Specifically, and as best shown in FIG. 4, these graduated "V"-shaped cradle interior members 56 are oriented in graduated pairs having a series of decreasingly graduated "V" angles in order to accommodate and retain items of various sizes and shapes within the "U"-shaped cradle 30. As shown, the upper-most set of "V"-shaped cradle interior members 56 approach a vertical orientation, followed by a second set directly below which are angled more inwardly than the first set, followed by a third set that are angled inwardly still more than the second set. These graduated sets of "V"-shaped cradle interior members 56 function to wedge an item down into the appropriate "V" under the weight of the particular item.

The molded rubber "V"-shaped cradle interior members 56 are sufficiently pliable and resilient that they will "give" slightly under the weight of the item positioned within the "U"-shaped cradle, and permit the force of the weight of the item to wedge itself downwardly into the appropriate "V"-shaped cradle interior member 56 in order to retain the particular item therein. Understandably, once the item is wedged down into the appropriate "V"-shaped cradle interior member 56, the locking strap 54 is stretched over the outer "U"-shaped piece (the right one as shown in FIG. 4) and positioned under the appropriate molded rubber finger 48 in order to retain the locking strap in position, and therefore, to retain the item in a lock position within the "U"-shaped cradle 30.

Figure 5:
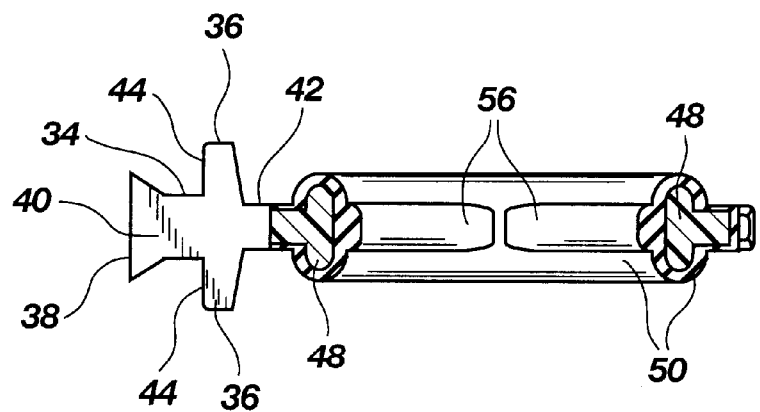
FIG. 5 is a horizontal sectional view of the item-holding device taken through lines 5—5 in FIG. 4.

The removable holder of the present invention is of a multi-faceted design. The first embodiment shown in FIGS. 1, 4 and 5 is that of a "U"-shaped cradle 30, and is designed to form, for instance, one-half of a wall-mounted gun rack, in a pick-up truck rear window, for instance. In this regard, it should be obvious that two such removable holders are mounted in essentially horizontal alignment on the inside surface of the rear window glass of a pick-up truck, thereby forming a gun rack for holding elongate objects (rifles, fishing poles, etc.). The use of two removable holders of the present invention as a gun rack, however, has numerous advantages over conventional gun racks for use in pick-up truck rear windows. Specifically, the "V"-shaped cradle interior members 56 within the "U"-shaped cradle 30 function both to better grip the object carried therein (rifle, fishing pole, etc.), and provide a soft cushion for the particular item in order to minimize scratching or other damage to the item.

Secondly, the "U"-shaped cradles 30 of the removable holder of the present invention can be easily removed from their respective mounting bases 10 when not in use. In this regard, the mounting bases 10 permanently remain affixed to the inside surface of the rear window of the pick-up truck, but are sufficiently small as to be non-obtrusive. By removing the two or more "U"-shaped cradles 30 from their mounting bases 10, the user provides himself with additional head room behind the seats, and can also avoid the appearance that he frequently carries a rifle in his pick-up truck. The "U"-shaped cradle members 30 are easily removed from the mounting bases by manually pressing the locking tab 46 into the plane of the planar back plate (i.e., toward the mounting surface, the rear window glass), and thereafter simply pulling the "U"-shaped cradle 30 upwardly and out of its dovetail mounting receptacle.

Figure 6:
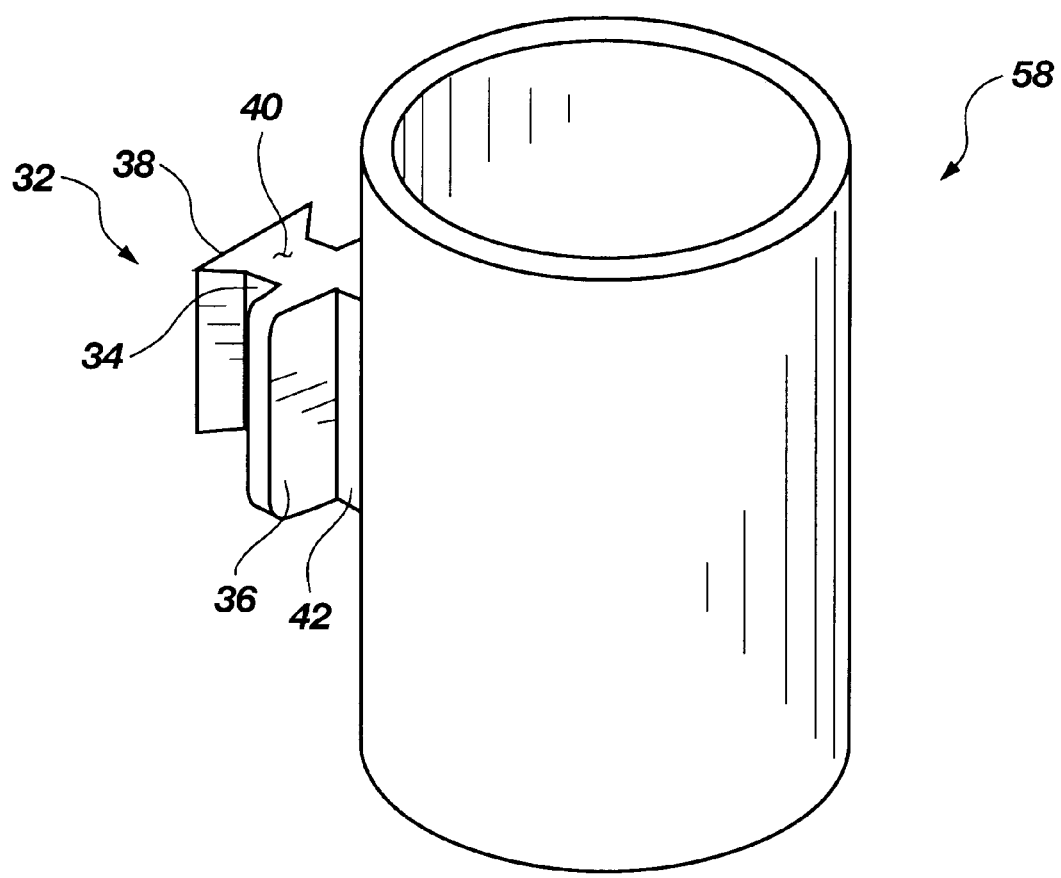
FIG. 6 is a perspective view of an alternative removable holder item-holding device of the present invention.

FIG. 6 shows an alternative embodiment of the item-holding device, illustrated at 58 to be a cup holder. In this regard, the mounting base 10 may be mounted on a vehicle dashboard so that one vehicle user may use the removable holder in its cup holder 58 embodiment, while another user of the vehicle may use the removable holder in some other embodiment (i.e., a cell phone holder, a notepad holder, etc.) Therefore, of course, the removable holder of the present invention is not limited to pick-up truck rear windows, but rather, may be utilized on any flat, not necessarily vertical, surface wherein a removable holder of this sort is desired for holding various objects. Specifically, the first embodiment (the "U"-shaped cradle) can be used on the dashboard of a recreational boat for holding any conceivable elongate object (i.e., flag pole, fishing pole, water skis, etc.). The "U"-shaped cradle can also be readily removed and replaced with the cup holder shown in FIG. 6, or any of a number of other removable item-holding devices. In addition, the "U"-shaped cradle of FIGS. 1 and 4 can also be mounted to the inside or outside of a recreation or fishing boat for holding specific elongate items (again, fishing poles, skis, flag poles, etc.), and can be readily removed when not intended for use. Likewise, the "U"-shaped cradle can be utilized (in pairs) on the inside or outside of pickup truck beds, again for holding various elongate objects.

The removable holder of the present invention also has utility in nonmobile environments. Specifically, the mounting base 10 may be attached to the side of a computer monitor, and utilize the cup holder of FIG. 6 for conveniently holding a drink at a computer work station in a manner to prevent the drink from being inadvertently tipped over and spilled. A second user for the computer may readily replace the cup holder 58 with a cell phone holder or document holder (not shown).

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

PARTS LIST 10 mounting base
12 item-holding device
14 mounting base planar back plate
16 mounting holes
18 suction cups
20 mounting screws
22 peel-and-stick adhesive
24 mounting base mounting receptacle
26 dovetail angled surfaces
28 mounting receptacle front surface
30 item-holding "U"-shaped cradle
32 cradle male dovetail mechanism
34 dovetail rib
36 dovetail retaining lip
38 flared-out section—dovetail
40 dovetail mechanism top surface
42 boss connecting dovetail and "U"-shaped cradle
44 dovetail retaining lip rear surfaces
46 mounting base planar backplate locking tab
48 molded hard plastic "U"-shaped piece
50 molded rubber encasement
52 molded rubber fingers
54 locking strap
56 "V"-shaped cradle interior members
58 cup holder

What is claimed is:

1. A removable holder for various items comprising:
   an item-holding device comprising:
      an item receptacle for receiving and supporting the item therein; and
      a mounting lug formed with the item receptacle, the mounting lug comprising a dovetail section having an enlarged portion opposite the item receptacle, an essentially planar top surface, and an essentially planar bottom surface opposite the top surface; and
   a mounting base comprising:
      an essentially planar plate for permanently attaching the mounting base to an essentially flat mounting surface;
      a mounting receptacle formed with the planar plate for removably receiving the item-holding device mounting lug therein; and
      a locking mechanism for locking and retaining the item-holding device mounting lug within the mounting base mounting receptacle, the locking mechanism comprising a locking tab formed with the mounting base planar plate, and biased outwardly from the planar plate toward the mounting base mounting receptacle in a manner to directly engage the item-holding device mounting lug top surface to lock the mounting lug in position within the mounting base mounting receptacle;
         wherein the item-holding device comprises a cradle including a pliable and resilient item-support member mounted on an interior item-receiving surface; and
         wherein the item-support member comprises a plurality of "V"-shaped interior members within the cradle in stepped graduations of "V" angle for facilitating the weight of an item placed within the cradle to cause the item to be wedged downwardly into the appropriate "V"-shaped interior member to retain the item therein.

2. A removable holder as set forth in claim 1, wherein the locking mechanism is automatic upon insertion of the item-holding device mounting lug into the mounting base mounting receptacle.

3. A removable holder as set forth in claim 1, wherein the mounting base locking mechanism is manually operable to release the item-holding device from the mounting base by manually pushing the locking tab toward the mounting base plate in order to release the locking tab from the item-holding device mounting lug top surface.

4. A removable holder as set forth in claim 1, wherein the holding device comprises a cradle having the interior item-receiving surface and an outer surface.

5. A removable holder as set forth in claim 4, wherein the cradle is essentially "U" shaped.

6. A removable holder as set forth in claim 5, wherein the cradle includes a locking strap that is manually positionable around the cradle outer surface in a manner to retain an item in locked position within the cradle.

7. A removable holder as set forth in claim 6, wherein the cradle outer surface includes a latching finger for latching the locking strap thereto.

8. A removable holder as set forth in claim 6, wherein the locking strap is resilient.

9. A removable holder as set forth in claim 1, wherein the holder mounting base planar plate includes an adhesive for attaching the mounting base to the mounting surface.

10. A removable holder as set forth in claim 1, wherein the locking tab is integrally formed with the mounting base planar plate.

11. An item-holding device comprising a "U"-shaped item receptacle for receiving and supporting the item therein, the "U"-shaped item receptacle having a support member comprising a plurality of angled interior wedge members disposed end-to-end within the item receptacle in stepped, angled graduations with respect to each other for facilitating the weight of an item placed within the item receptacle to cause the item to be wedged downwardly thereinto to retain the item therein.

12. An item-holding device as set forth in claim 11, wherein the item receptacle includes a locking strap that is manually positionable around the item receptacle outer surface in a manner to retain an item in locked position within the item receptacle.

13. An item-holding device as set forth in claim 12, wherein the item receptacle outer surface includes a latching finger for latching the locking strap thereto.

14. A removable holder as set forth in claim 12, wherein the locking strap is resilient.

15. An item-holding device as set forth in claim 11, wherein the angled interior wedge members are substantially pliable and resilient.

16. An item-holding device as set forth in claim 11, wherein the angled interior wedge members are fully supported along a length thereof by an interior surface of the U-shaped receptacle.

17. A removable holder for various items comprising:
an item-holding device comprising:
  an item receptacle for receiving and supporting the item therein including a pliable and resilient item-support member mounted on an interior item-receiving surface; and a mounting lug formed with the item receptacle, the mounting lug comprising an enlarged portion opposite the item receptacle, an essentially planar top surface, and an essentially planar bottom surface opposite the top surface; and a mounting base comprising:

an essentially planar plate for permanently attaching the mounting base to an essentially flat mounting surface;

a mounting receptacle formed with the planar plate for removably receiving the item-holding device mounting lug therein; and a locking mechanism for locking and retaining the item-holding device mounting lug within the mounting base mounting receptacle, the locking mechanism comprising a locking tab formed with the mounting base planar plate, and biased outwardly from the planar plate toward the mounting base mounting receptacle in a manner to directly engage the holding device mounting lug top surface to lock the mounting lug in position within the mounting base mounting receptacle; and wherein the item-support member comprises a plurality of "V"-shaped interior members in stepped graduations of "V" angle for facilitating the weight of an item placed within the item receptacle to cause the item to be wedged downwardly into the appropriate "V"-shaped interior member to retain the item therein.

18. An item-holding device comprising a "U"-shaped item receptacle for receiving and supporting the item therein, the "U"-shaped item receptacle having substantially pliable and resilient angled interior wedge members within the item receptacle for facilitating the weight of an item placed within the item receptacle to cause the item to be wedged downwardly thereinto to retain the item therein the wedge members having straight continuous opposing exterior surfaces forming a chord relative to the curvature of the "U"-shaped receptacle.

19. An item-holding device comprising a "U"-shaped item receptacle for receiving and supporting the item therein, the "U"-shaped item receptacle having angled interior wedge members being fully supported along a length thereof by an interior surface of the U-shaped receptacle for facilitating the weight of an item placed within the U-shaped receptacle to cause the item to be wedged downwardly thereinto to retain the item therein, the wedge members having straight continuous opposing exterior surfaces forming a chord relative to the curvature of the "U"-shaped receptacle.

* * * * *